Figure 1:
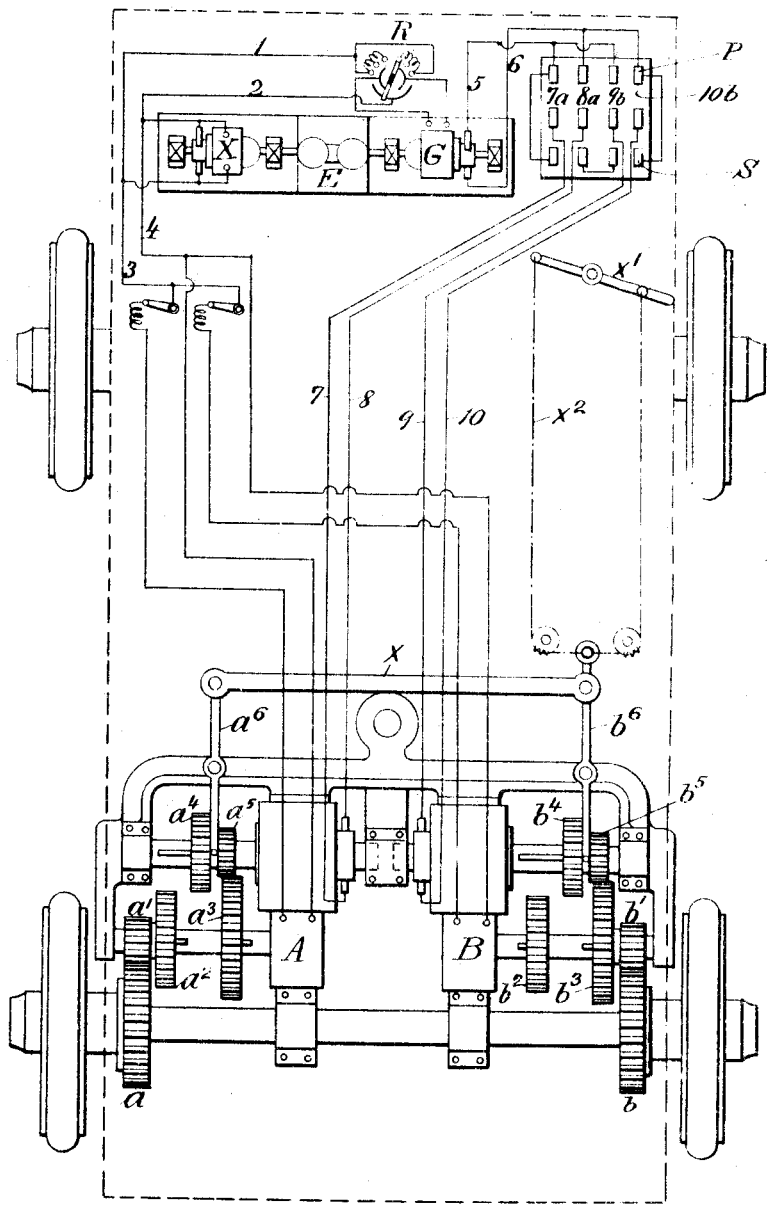

H. W. LEONARD.
ELECTRICALLY PROPELLED VEHICLE.
APPLICATION FILED JUNE 1, 1910.

1,121,380.

Patented Dec. 15, 1914.
4 SHEETS—SHEET 1.

Witnesses:
E. O. Dubocq
Henry J. Lucke

H. Ward Leonard Inventor
By his Attorneys
Edwards, Sager & Wooster.

H. W. LEONARD.
ELECTRICALLY PROPELLED VEHICLE.
APPLICATION FILED JUNE 7, 1910.
1,121,380.
Patented Dec. 15, 1914.
4 SHEETS—SHEET 2.
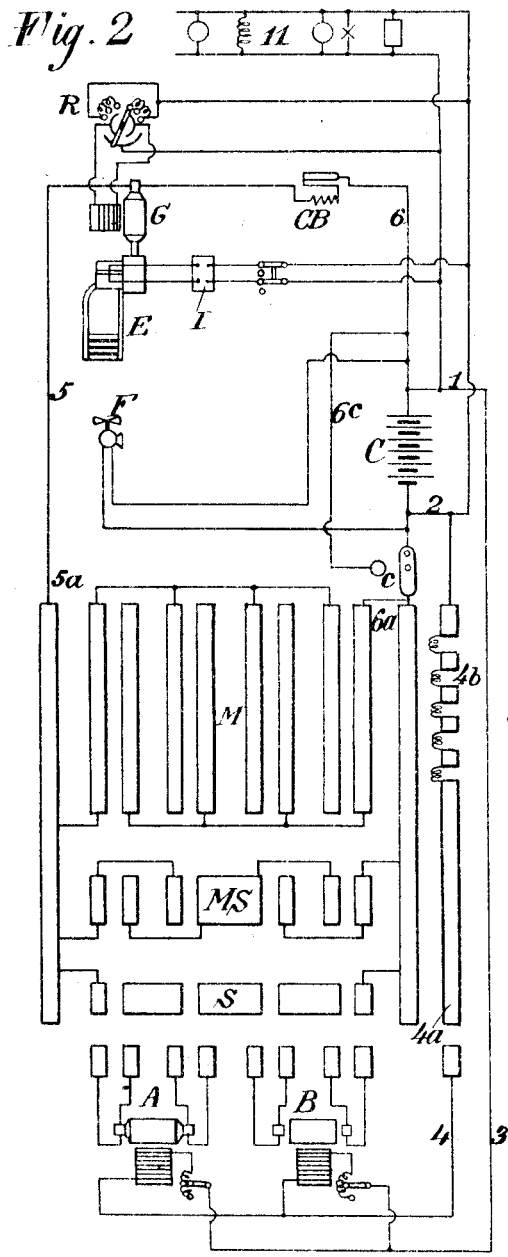
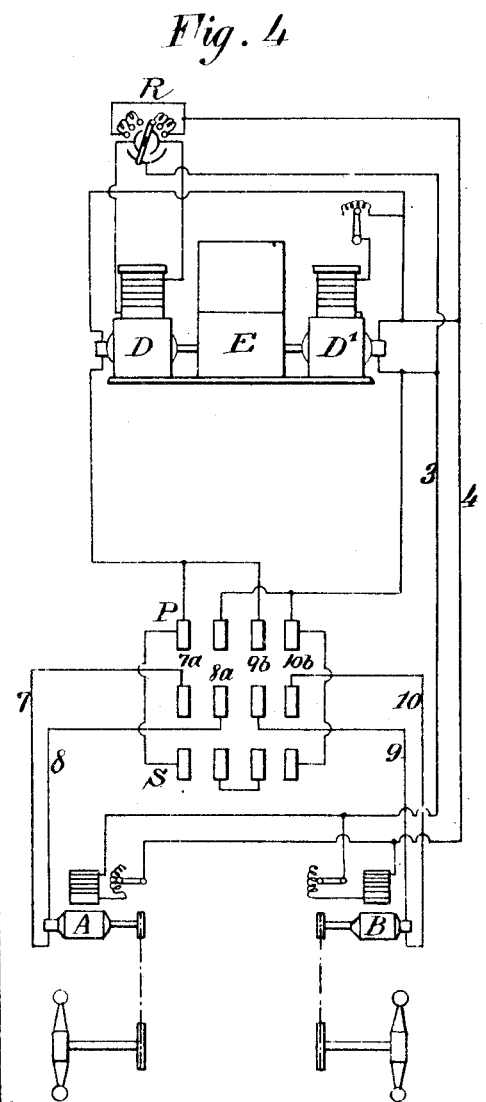

H. W. LEONARD.
ELECTRICALLY PROPELLED VEHICLE.
APPLICATION FILED JUNE 7, 1910.

1,121,380.

Patented Dec. 15, 1914.
4 SHEETS—SHEET 3.

UNITED STATES PATENT OFFICE.

HARRY WARD LEONARD, OF BRONXVILLE, NEW YORK.

ELECTRICALLY-PROPELLED VEHICLE.

1,121,380. Specification of Letters Patent. Patented Dec. 15, 1914.

Original application filed March 2, 1903, Serial No. 145,686. Renewed May 26, 1908, Serial No. 435,119.
Divided and this application filed June 7, 1910. Serial No. 565,512.

*To all whom it may concern:*

Be it known that I, HARRY WARD LEONARD, a citizen of the United States, residing at Bronxville, in the county of Westchester and State of New York, have invented certain new and useful Improvements in Electrically-Propelled Vehicles, of which the following is a full, clear, and exact specification.

This application is a division of my pending original application filed March 2, 1903, Serial No. 145,686, renewed May 26, 1908, Serial No. 435,119.

My invention relates to various devices and more especially to that class of vehicles in which an engine is employed for driving a dynamo electric machine which supplies energy to one or more propelling electric motors.

The principal object of my invention when applied to vehicles is to secure more perfect control of the speed and effort over the wide range desirable in order to secure the best results in practice.

Further objects of my invention are the reduction of wear, breakage, noise, strain and shock present in apparatus of this general character as heretofore proposed; the utilization of the simplest, cheapest and best form of prime mover under conditions most favorable for its use; and the use of electric motors for propelling the vehicle under conditions most favorable to their efficiency and durability.

The principal features of my invention when applied to wheeled vehicles may be briefly stated as follows: I develop upon the vehicle itself by means of a prime mover, such as a gasolene engine, power employed in the propulsion of the vehicle forming the moving load element in this case, and this power is transformed into electric energy, the electromotive force of which is controllable over a wide range at the will of the operator. This electric energy is supplied to one or more propelling motors at such a voltage and current as will cause the vehicle to travel at the speed desired according to the road surfaces and grades met with. In practice the electrical transmission as I employ it replaces the usual mechanical variable or change speed gear, although in some instances I may employ such a gear in addition to the electrical control or electrical transmission gear as it may be termed. These and other features of my invention will be understood from the following description and accompanying drawings which illustrate certain forms of my invention.

Figure 3:
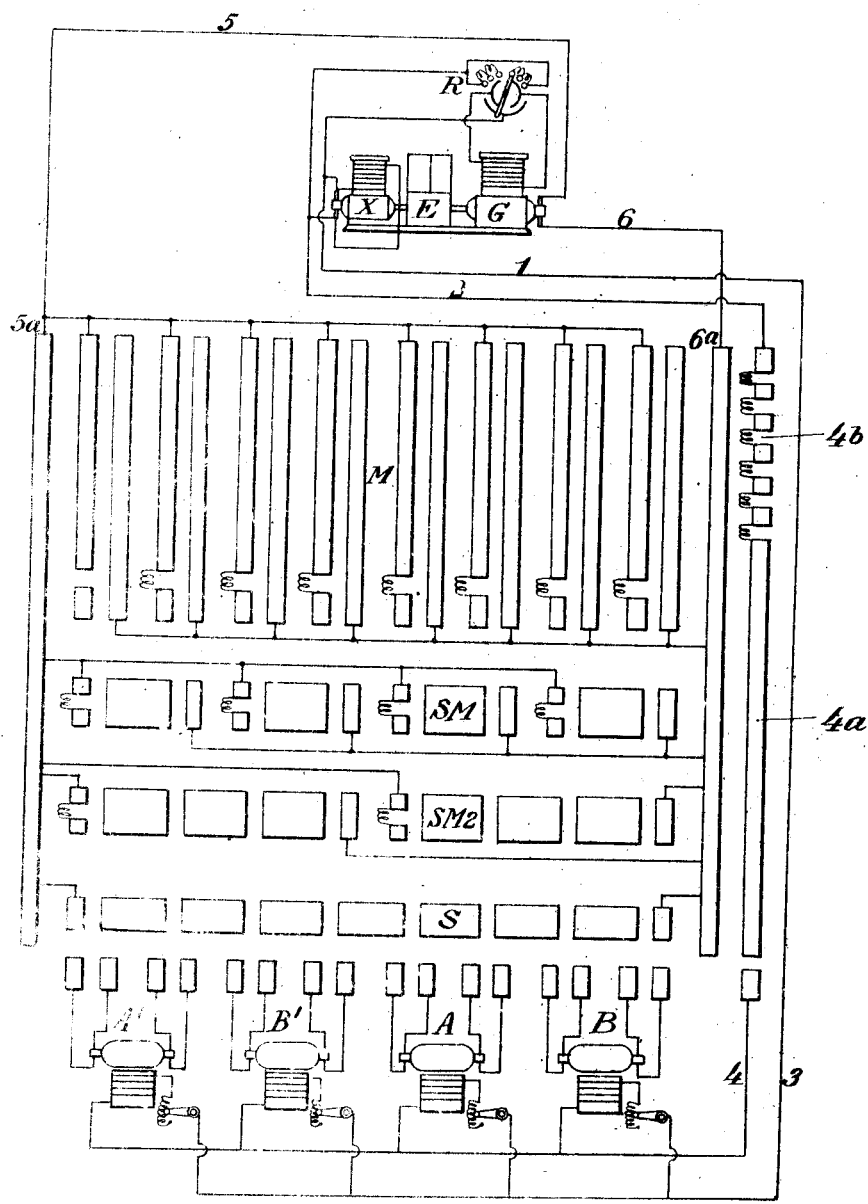
Figure 5:
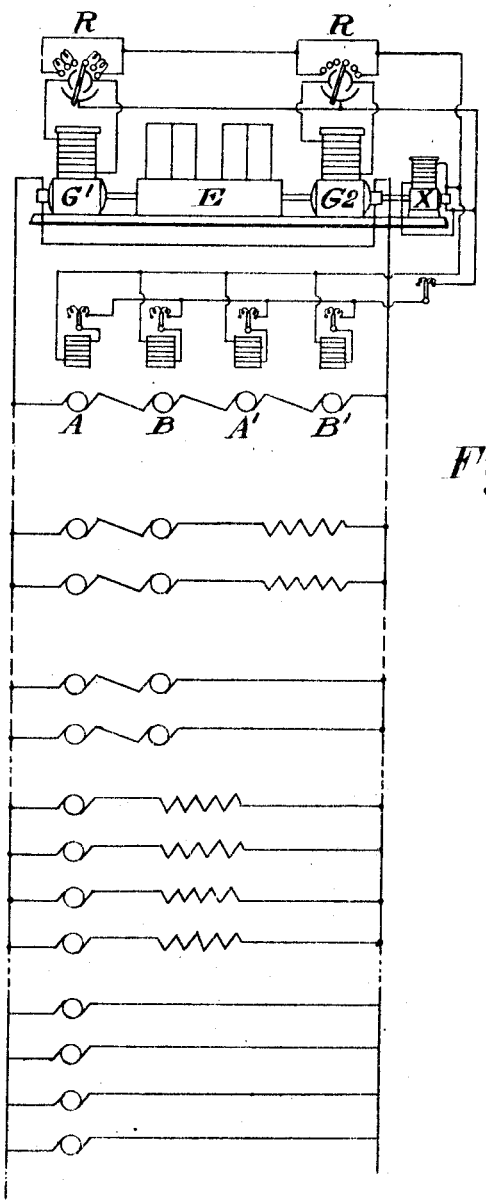

Figure 1 is a diagrammatic illustration of a motor truck embodying certain features of my invention; Fig. 2 is a diagram illustrating an embodiment of certain features of my invention and a form of series-parallel controller which may be employed for controlling the electrical apparatus illustrated in Fig. 1; Fig. 3 is a diagrammatic view of another embodiment of certain features of my invention; Fig. 4 is a diagrammatic view of another embodiment of certain features of my invention in which a counter-electromotive force system of regulation is employed for the dynamo electric machines supplying energy to the propelling motors, and a series-parallel method of control for the armatures of the propelling motors: and Fig. 5 is a diagram of a modified system of motor control, the extensions indicating the connections established by means of a series-parallel controller.

In Fig. 1 the rear traction wheels are journaled on separate short shafts, and each wheel is driven by separate electric motors A and B through double reduction gears. The motors are spring suspended at one end in any suitable and well-known manner, and the vehicle axle passes through the other end of each motor as is common in modern street railway motor suspension. The double reduction gear comprises gear wheel $a$ which is keyed to the shaft of its respective traction wheel, a pinion $a'$ meshing therewith, a gear wheel $a^2$, a gear wheel $a^3$ of larger diameter than wheel $a^2$, said pinion and the gear wheels $a^2$ and $a^3$ being keyed on a counter shaft, and pinions $a^4$ and $a^5$ splined on the armature shaft of motor A, the latter pinion being of smaller diameter than the pinion $a^4$, and said two pinions being arranged to slide on the shaft so as to place one or the other in mesh with its respective gear wheel $a^2$ or $a^3$. The reduction gear for motor B is exactly the same, and corresponding wheels and pinions are marked $b$ to $b^5$. As illustrated in Fig. 1, pinions $a^5$ and $b^5$ are in mesh with gear wheels $a^3$ and $b^3$ respectively, which is the lowest speed connection, and when the pinions on the motor shafts are shifted simultaneously pinions $a^4$ and $b^4$ are brought into mesh with gear wheels $a^2$ and $b^2$ respectively, which connection gives the second or higher speed. The pinions on the motor shaft may be shifted simultaneously in any suitable manner, and for the purpose of illustration I have shown two pivoted levers $a^6$ and $b^6$ which engage collars on the pinions, and said levers being connected by a rod $x$ so as to shift in unison. These levers are connected to a shifting or controlling lever $x'$ within reach of the operator by means of a rod or chain $x^2$. At the forward end of the truck is located preferably a two cylinder gasolene engine E which drives a generator G. This generator supplies the energy for the armatures of the propelling motors, and the engine also drives an exciter X of constant electromotive force which energizes the fields of the propelling motors and the generator.

The circuit connections of Fig. 1 are as follows: From the armature of exciter X extends a circuit 1—2 with which is connected a circuit 3—4 between which the field windings of motor A and B are connected in multiple through resistances. The field circuit of generator G is connected across the exciter circuit 1—2 through a reversing switch R. From the armature of generator G extends a circuit 5—6 to the stationary contacts of a series-parallel switch S—P and from the armatures A and B extend circuits 7—8 and 9—10, respectively, to four switch blades $7^a$, $8^a$, $9^b$, and $10^b$, respectively. The stationary contacts P are for connecting the motor armatures in parallel, and contacts S for connecting the armatures in series. In changing the armature connections from series to parallel, I may employ an intermediate step in which the armatures are in parallel but with a resistance in series with each. For this purpose I prefer to use a series-parallel controller of the drum type, but as this form of controller is well known I do not illustrate the same in detail, but it may be arranged somewhat similar to that illustrated in Fig. 3.

With the apparatus illustrated in Fig. 1 it will be seen that two speeds can be obtained in either direction by manipulating the series-parallel switch S—P and by manipulating the gearing between the motor shafts and the traction wheels two additional speeds may be obtained, as will be apparent. If the controller S—P is provided with intermediate steps, two additional speeds will be obtainable for each step, i. e., one due to the position of the controller and the other by shifting the gears at the motors. To reverse the direction of rotation of armatures A and B the field of generator G is reversed by means of reversing rheostat R.

By exciting the motor fields independently of the current or voltage of the motor armatures, and by passing the same current through the two motor armatures in series with each other, I secure a combined torque from the two armatures which is more definitely divided between the two armatures than has been heretofore attained. This results in a more perfect control under conditions of starting and at very slow speeds and while being brought to rest by the dynamic braking action by the motors acting as generators.

In Fig. 2 I show a modified method of control for the propelling motors A, B, shown in Fig. 1. This modified arrangement involves the employment of two windings in each armature and a commutator for each winding so that the windings can be connected in series or in parallel. In this arrangement I also prefer to use in practice intermediate steps in which resistances are inserted first before passing from a lower to a higher electromotive force per winding as is well understood by those skilled in the art of electric motor control. In this arrangement I have also shown a storage battery C which is so connected in the armature circuit of generator G that the normal current to the motor armatures charges the battery. This battery serves as the source of constant electromotive force for exciting the motor and generator fields. This battery also supplies the current for operating an electric fan motor F which blows air over the radiating surface of the thermosiphon water cooling system for the cylinders of gasolene engine E.

In the controller as illustrated in Fig. 2 the circuit 5—6 from the generator G is connected by brushes or other suitable contact devices with contact plates $5^a$ and $6^a$ between which are connected three or more sets of contact plates M, MS and S representing, respectively, multiple, multiple series and series, whereby when the stationary contacts with which the armature circuits of motors A and B are connected make contact with said contacts M, MS and S successively, said armature winding will be connected respectively in multiple, multiple series and series, that is, when on contacts M the windings on both armatures will all be in multiple arc relation; when on contacts MS the two armatures will be in series relation but with the windings of each armature connected in multiple arc relation; and when on contacts S all the windings will be in series relation. The field windings of motors A and B are connected in multiple across circuit 3—4 with a resistance in series with each winding. The conductor 3 is connected with a conductor 1 extending from one terminal of battery C, and conductor 4 is connected to a stationary contact which makes contact with plates $4^a$ and $4^b$, which are connected to conductor 2 extending from the other terminal of battery C. The field circuit of generator G is connected across conductors 1—2 with a reversing rheostat R in the circuit for reversing the field excitation of the generator. As shown battery C is connected between contact plate 6ª and conductor 6 so as to be in the armature circuit of generator G, but I provide a switch c whereby the battery may be cut out of the armature circuit of generator G when fully charged without breaking the field exciting circuit of the motors and generator. For this purpose a loop 6ᶜ extends around the battery from conductor 6, and it will be seen, that when switch c is moved to the second contact, circuit 6 extends around the battery to plate 6ª, but the battery still supplies energy to the field windings. In conductor 6 between battery C and generator G an automatic circuit breaker CB is preferably connected.

With the arrangement illustrated in Fig. 2, I obtain three fixed speeds for each voltage of the supply current and three torques in the ratio of one, two and four, with a certain current from generator G and a certain motor field. By means of generator G I can obtain any range of electromotive force from zero to maximum, and when the windings of the motor armatures are all in multiple I can weaken the fields of the motors by resistances 4ᵇ connected between the set of contacts 4ª to obtain a still further range of speed. The rheostat in series with the field windings of motors A and B are independent of each other so that the fields may be adjusted as desired relatively to each other.

The storage battery C may also be employed for supplying the current for the electric igniting device of the engine and leads from the battery are shown extending to the induction coil 1 and thence to the engine for that purpose. Current from the battery may also be used for supplying electric lights, electric brakes, electric alarms, electric heaters, etc., and this is indicated on the drawing by a circuit 11 from the battery having various translating devices connected in parallel thereto. The storage battery also serves as a source of energy for starting by closing the armature circuit of the generator, as by closing the circuit through the motors, battery and circuit breaker after first exciting the field of the generator. The direction of the current through the circuit will be counter to the direction under normal running conditions and will therefore cause the generator to rotate in the proper direction and act as a motor to drive the engine. As soon as the engine begins to produce power the electromotive force of the generator will rise until it exceeds that of the battery, since the generator has a much higher electromotive force than the battery, and the current will then flow in the normal direction for forward running. If the current rises to an excessive amount, the circuit breaker will open the circuit automatically. The operator would then reduce the generator field to zero, close the circuit breaker and proceed to operate the motor car by slowly building up the generator field.

The starting up may also be accomplished by first giving the generator field its full strength and closing the armature circuit, while leaving the circuit of the sparking device open. This will cause the generator to operate as a motor at a low speed. The armature circuit should now be opened at the circuit breaker and the circuit of the sparking device closed simultaneously. This will cause the engine to operate and run up to full speed. The field strength of the generator should now be reduced and the armature circuit closed again which places the apparatus in condition for operation.

In Fig. 3 I have illustrated four propelling motors A, B, A' and B' provided with double wound armatures as in Fig. 2. The field windings of these motors are connected in multiple arc relation across circuit 3—4 with a resistance in series with each winding for the purpose of adjusting the fields relatively to each other. Circuit 3—4 is connected across circuit 1—2 extending from exciter X, conductor 4 being attached to a stationary contact adapted to make contact with plates 4ª and 4ᵇ which are connected with conductor 2. The field winding of generator G is connected across circuit 1—2 through reversing rheostat R. E represents a two-cylinder gasolene engine for driving machines X and G. The armature circuit 5—6 from generator G is connected with brushes or other suitable contacts engaging plates 5ª and 6ª and between these plates are connected a series of moving contacts M, SM, SM² and S, with which the stationary contacts to which the armature windings of the motors are connected, make contact. With the four sets of contacts arranged as shown the eight armature windings will be connected in multiple arc relation when the stationary contacts are on plates M; when on plates SM the two windings of each armature will be in series and the four armatures in multiple arc relation; when on plates SM² the windings will be in two series of four each, that is the windings of the two forward armatures will be in series and the windings of the two rear armatures will be in series, the two series being connected across the line in multiple arc relation; and when the stationary contacts are on plates S the eight armature windings will be in series across the line. In this diagram I have shown the intermediate steps supplied with resistances so as to pass smoothly from one arrangement of the armature windings to the next. The arrangement of windings and connections illustrated gives four torques in the ratios of one, two, four and eight, with a certain number of amperes generated by machine G, and constant motor fields. When the windings of the motor armatures are all in multiple the motor fields may be weakened by resistances $4^b$ to obtain a still further range of speed. The electromotive force of the generator can be varied from zero to its maximum electromotive force in either sense to vary the energy supplied to the armatures of the propelling motors, and the field of the propelling motors can also be varied, so as to secure the widest possible range in speed and torque.

In Fig. 4 wherein I illustrate the counter electromotive force method of control, A and B represent the propelling motors geared to the rear traction wheels, E represents a two-cylinder gasolene engine and D, D' represent two dynamo electric machines driven by said engine. The field windings of the working motors are connected in multiple arc relation across the circuits 3—4, which circuit is connected across the armature terminals of machine D' and are of constant strength. Machine D' has a shunt field winding and machine D has its field winding connected across the armature terminals of machine D' through a regulating reversing rheostat R. The armatures of machines D and D' are connected in series to the stationary contacts of a series-parallel controller SP, and the armature circuits 7—8, 9—10 of the propelling motors are connected to switch blades $7^a$, $8^a$, $9^b$, and $10^a$, respectively. It is well understood that the energy supplied to the armatures of the working motors through the agency of machine D and D' can be varied at will from zero to the combined electromotive force of both machines by adjusting the field of machine D so that it will either oppose or assist the electromotive force of machine D'. This arrangement in itself would give a very wide range of speed for the propelling motors, but by the addition of the series-parallel controller as in the arrangement of Fig. 1, the number of successive variations in speed or torque can be still further increased.

In Fig. 5 I have illustrated a system in which E represents a four cylinder gasolene engine and G' and $G^2$ dynamo electric machines driven by said engine, and X an exciter also driven by said engine. The field windings of the two machines G', $G^2$ are connected in parallel across the armature terminals of exciter X, a reversing rheostat R being connected in each field circuit. A, B, A' and B' represent the propelling motors, the field windings of which are connected in parallel across the armature terminals of exciter X. The armatures of these machines will be controlled by a series-parallel controller, similar to that illustrated in Fig. 3, and to illustrate the several connections, the circuit from generators G' $G^2$ is extended in sections. In this arrangement the armatures of machines G' and $G^2$ are connected in series and the successive connections of the motor armatures are illustrated in five combinations, viz., four armatures in series; two armatures in series in each group with a resistance in series with each group; two armatures in series in two groups without resistance; four armatures in parallel with a resistance in series in each; and four armatures in parallel without resistance. The energy supplied to the armatures of the propelling motors can be varied from zero to maximum in either direction by adjusting the reversing rheostats R relatively to each other. A rheostat is inserted in the field circuit of each motor for adjusting the fields relatively to each other, and another rheostat is connected in the circuit leading to those fields from exciter X for the purpose of regulating all the motor fields simultaneously and similarly.

It will be seen that if the electromotive force of the generator, or generators supplying energy to the circuit, is lower than that of the opposing electromotive forces in the circuit, as may be the case in going down grades or in retarding the machine, the armature of the generator will be driven as a motor and act to retard or limit the speed of the vehicle to any desired amount. I may therefore cause the vehicle to be retarded by lowering the electromotive force of the generator by weakening its field as by means of the rheostat; the motors will then act as generators and supply energy to the generator which now acts as a motor. Since the vehicle when going down grade can be reversed and caused to back up the grade, it will be apparent that by placing the controlling rheostat at a proper position, a current can be passed from the generator through the motors which will tend to move the vehicle backward up the grade but will be just sufficient to balance the tendency of the vehicle to move down the grade by virtue of its weight. My invention therefore affords a simple arrangement for holding the vehicle stationary when either going up a grade or going down a grade and without the necessity of using brakes.

While I have shown separate dynamo electric generators and dynamo electric motors as the means for transmitting electrically the energy of the prime mover to the wheels, it will be understood that my invention is not limited to such means but may cover any suitable means for electrically transmitting the power of the prime mover to the driven device or devices.

While I have shown and described certain forms of my invention, it will be understood that the scope of my invention is not confined thereto, and that I am limited only as indicated in the following claims.

What I claim is:

1. An electrically propelled steerable road vehicle, an internal combustion engine thereon for developing the necessary power, an electric generator driven by said engine and having a separately excited field winding, two independently rotatable traction wheels, two driving electric motors one for each wheel respectively, and a switching device for connecting the armature circuits of said motors in series or in parallel relatively to each other.

2. An electrically propelled steerable road vehicle, an internal combustion engine thereon for developing the necessary power, an electric generator driven by said engine and having a separately excited field winding, two independently rotatable traction wheels, two electric motors geared to said wheels respectively, said motors having separately excited field windings, and a switching device for connecting the armature circuits of said motors in series or in parallel relatively to each other.

3. An electrically propelled vehicle, an internal combustion engine thereon for developing the necessary power, a dynamo driven by said engine, said dynamo having an armature and a field winding, propelling motors having their armatures connected in circuit with the armature of said generator, a storage battery connected in series with the generator, two independently rotatable traction wheels driven by said motors respectively, and means for exciting the field winding of said generator from said storage battery.

4. An electrically propelled vehicle, an internal combustion engine thereon, a dynamo driven by said engine, said dynamo having an armature and a field winding, propelling motors having their armatures connected in circuit with the armature of said generator, two independently rotatable traction wheels driven by said motors respectively, a storage battery in series with the generator and motor armatures, and means for exciting a field winding of said generator and a field winding of said motors from said storage battery.

5. An electrically propelled vehicle, an internal combustion engine thereon, a dynamo having an armature and a field winding, means for mechanically driving the armature of said dynamo by said engine, a storage battery for exciting a field winding of said dynamo, said battery having a maximum electromotive force materially lower than that of said dynamo, a plurality of independently rotatable traction wheels, and a plurality of propelling motors supplied with energy from said dynamo and driving said wheels respectively, the current from said dynamo passing through said battery in a direction to charge it.

6. The combination of a vehicle, said vehicle having two independently rotatable driving wheels, two electric motors for driving said wheels, an electric generator having an armature and a field winding, means for connecting the armatures of said motors in parallel with each other and in series with the armature of said generator, a source of electromotive force for supplying current to a field winding of each of the motors and to a field winding of said generator independently of the electromotive force of said generator and independently of the current passing through the motor armatures, and means for varying at the will of the operator the electromotive force of said generator from a minimum to a maximum value and for varying the field strength of the motors to cause them to divide the total load between them proportionately.

7. The combination of a steerable road vehicle, said vehicle having two independently rotatable driving wheels, two driving electric motors one for each wheel respectively, gearing between each of said motors and its respective wheel, an electric generator having an armature and a field winding, means for connecting the generator armature in circuit with the armatures of said motors, a source of electromotive force for supplying current to a field winding of each of the motors and to a field winding of said generator independently of the electromotive force of said generator and independently of the current passing through the motor armatures, means for varying at the will of the operator the electromotive force of said generator from a minimum to a maximum value, and means for varying the gearing ratio between each of said motors and its respective wheel.

8. The combination of a steerable road vehicle, said vehicle having at least two propelling wheels, an electric motor for each of said propelling wheels respectively, each of said motors and its propelling wheel having no mechanical driving connection with any other motor and wheel, a generator adapted to supply energy to said motors, said generator having an armature and a field winding, a source of electromotive force, a field winding of said generator and a field winding of said motors being supplied from said source of electromotive force, and means for varying the electromotive force of the generator at the will of the operator from a minimum to a maximum value and for varying the field strength of the motors.

9. An electrically propelled vehicle, an internal combustion engine thereon for developing the necessary power, a dynamo driven by said engine, said dynamo having an armature and a field winding, propelling motors having their armatures connected in circuit with the armature of said generator, a storage battery charged by energy derived from said engine, two independently rotatable traction wheels driven by said motors respectively, and means for exciting the field winding of said generator from said storage battery.

10. An electrically propelled vehicle, an internal combustion engine thereon, a dynamo driven by said engine, said dynamo having an armature and a field winding, propelling motors having their armatures connected in circuit with the armature of said generator, two independently rotatable traction wheels driven by said motors respectively, a storage battery charged by energy derived from said engine, and means for exciting a field winding of said generator, and a field winding of said motors from said storage battery.

11. A self-propelled steerable road vehicle having two wheels adapted to be independently driven, two dynamo electric machines, means for mechanically connecting the movable element of said machines to said wheels respectively, a dynamo electric machine on the vehicle mechanically independent of said wheels, each of said first named two machines having a separately excited field winding, and means for causing the third machine to act as a generator for supplying current to said two machines while they act as motors, for connecting the armatures of said two machines in series and in parallel, for causing said two machines to act as generators to supply energy to said third machine as a motor, and for controlling the current in said separately excited field windings.

12. A self-propelled steerable road vehicle, a source of prime power on said vehicle comprising an internal combustion engine, an electric generator driven by said engine, a plurality of electric motors, a plurality of independently rotatable tractive road wheels driven by said motors respectively, controlling means adapted to connect the armature windings of said motors in series and in parallel across said generator armature for controlling the vehicle and adapted to still further control the vehicle by varying the field strength of the motors, and means for changing the mechanical speed ratio between said motors and said wheels.

13. The combination of a steerable road vehicle, a prime mover on the vehicle, a dynamo electric machine on the vehicle, means for varying the voltage of said machine, a plurality of electric motors, a plurality of propelling wheels of the vehicle each driven by one of said motors respectively, the armatures of said motors being supplied by said dynamo electric machine, means for connecting the motor armatures in series and in parallel, and for causing at least one of said armatures to generate dynamic braking energy under certain conditions.

14. The combination of a steerable road vehicle, a prime mover on the vehicle, a dynamo electric machine on the vehicle, means for varying the voltage of said machine, a plurality of electric motors, a plurality of propelling wheels of the vehicle each driven by one of said motors respectively, the armatures of said motors being supplied by said dynamo electric machine, means for connecting the armatures in series and in parallel and for varying the motor field strength to effect speed control and for causing at least one of said armatures to generate dynamic braking energy.

In testimony whereof I affix my signature, in presence of two witnesses.

H. WARD LEONARD.

Witnesses:
CAROLYN G. LEONARD,
GEO. N. KERR.